United States Patent [19]

Blair et al.

[11] 4,230,929

[45] Oct. 28, 1980

[54] CONTROL CIRCUIT FOR A WELDING DEVICE

[75] Inventors: Bruce A. Blair; Howard G. McClure, both of Jackson, Mo.

[73] Assignee: Lenco, Inc., Jackson, Mo.

[21] Appl. No.: 868,899

[22] Filed: Jan. 12, 1978

[51] Int. Cl.³ .......................................... B23K 11/00
[52] U.S. Cl. .................................... 219/111; 219/114
[58] Field of Search ............... 219/108, 111, 114, 115; 307/141, 141.4; 328/129, 130, 131

[56] References Cited

U.S. PATENT DOCUMENTS

| | | | |
|---|---|---|---|
| 3,452,283 | 6/1969 | O'Neal, Jr. .......................... | 219/111 |
| 3,493,715 | 2/1970 | Bigowsky et al. ................... | 219/114 |
| 3,523,174 | 8/1970 | Haver .................................. | 219/108 |
| 3,541,429 | 11/1970 | Martin ................................ | 219/108 |
| 3,826,890 | 7/1974 | Bartlett ............................... | 219/108 |
| 3,909,620 | 9/1975 | Matsuda et al. .................... | 328/131 |

FOREIGN PATENT DOCUMENTS 1226817  2/1960  France ..................................... 219/108

Primary Examiner—B. A. Reynolds
Assistant Examiner—Clifford C. Shaw
Attorney, Agent, or Firm—Charles B. Haverstock

[57] ABSTRACT

A control circuit for accurately controlling the duration of a welding operation. In a preferred embodiment the control circuit includes first and second connectors for connecting the control circuit to a power source, welding and control transformers, the first connector being connected to the first terminals of the primary windings of the transformers and the second connector being connected to the second terminal of the primary winding of the control transformer, a trigger circuit portion including an operator actuatable switch connected across the secondary winding of the control transformer and producing a signal in response to actuation of the operator actuatable switch, a timing control circuit portion connected in parallel with the trigger circuit portion and including a multiposition switch selectively settable for establishing a desired weld time interval and another circuit portion operatively connected to the trigger circuit portion to respond to signals therefrom and to weld time interval switch settings to generate weld output signals, and a gating circuit portion under control of a control input thereof connected to receive weld output signals from the control circuit portion for controlling electrical communication between the second terminal of the primary winding of the welding transformer and the second connector so as to complete a power circuit through the primary winding of the welding transformer thereby establishing a welding circuit voltage potential across the secondary winding of the welding transformer, the duration of application of the welding circuit voltage potential being controlled by the setting of the multiposition switch.

11 Claims, 3 Drawing Figures

CONTROL CIRCUIT FOR A WELDING DEVICE

This invention relates to a control circuit for a welding or like device that may be employed to accurately control the time duration of a welding operation such as a spot welding operation.

In many welding operations it is important to be able to achieve rapid, uniform welds time after time for any given materials being welded. In the past, numerous attempts have been made to achieve such welding and numerous control circuits for welding machines have been constructed and employed to control the application of power to a welding transformer to effect desired welding operations. Most, if not all, however, have been unable to achieve the accuracy and reliability sought, often because of the inability of the control circuits to be able to accurately and repetitively control the application of power to the welding transformer. If the duration of the power application to the welding transformer is too short, the resulting weld spot may be weak due to insufficient welding. On the other hand, if the power application duration is too long, the material being welded may be burned or crystallized. Both situations are undesirable. Consequently, it may be seen that it is important to be able to control the weld time accurately time after time, weld after weld. Numerous control circuits have been devised to try to insure that uniform, quality welds can be produced time after time for given materials being welded together. In many instances, however, the user may also encounter situations where the materials to be welded differ from weld to weld, and where the duration of the power application required differs from weld to weld. For instance, in automotive body repair shops or small sheet metal shops it is frequently the case that materials to be welded and their thicknesses vary from weld to weld, and the weld duration must therefore be varied accordingly. Numerous control circuits, including such as those disclosed in U.S. Pat. Nos. 2,189,601; 2,226,375; 2,242,894; 2,480,678; 2,528,835; 2,533,318; 2,607,907; 2,721,306; 2,734,133; 2,765,402; 2,776,383; 2,776,395; 2,785,346; 2,790,115; 2,811,679; Re. 24,533; 2,883,579; 3,015,067; 3,157,772; 3,205,378; 3,233,116; 3,397,322; and 3,523,174, have been employed in the past to try to accurately control weld time. All, however, have suffered from various drawbacks and disadvantages. Many of these and other known control circuits employ mechanical contactors to make and break the weld power circuit. Many also are sensitive to minor fluctuations in the power source. These and other factors make it difficult to achieve uniformity in the welding of given materials time after time over a relatively long time period. Furthermore, with many of the known control circuits the weld time duration can be varied only by varying the resistance or capacitance of a portion of the control circuit, and, over a period of time, the adjustment of the mechanical pots employed in such circuits results in degradation in the accuracy of weld timing. Moreover, the mechanical nature of the pots in such circuits also presents difficulties in adjusting the pots to accurately select a desired weld time interval. Nevertheless, some of these known circuits have been widely employed and utilized by those active in the welding art. Typical of one of the more commercially successful control circuits is that disclosed in U.S. Pat. No. 3,397,322, which circuit, despite the advantages it offers and the commercial success it has enjoyed, is limited in its capability to accurately control the selection and duration of a weld time interval because of its reliance upon a variety of mechanical switches, relays, and associated mechanical equipment for controlling selection of desired weld time intervals and for effecting the timing of the weld time duration.

The control circuit of the present invention overcomes such limitations and employs solid state devices assembled in a novel type construction to more accurately control the selection and duration of a weld time interval and to provide a greater uniformity between welds. Because of the construction and the use of solid state components in the present invention, greater operational reliability can be achieved with fewer parts replacement problems, and, because the present invention provides for more accurate welds, less distortion is realized in the welded materials thereby reducing the amount of time needed to correct such distortions.

It is therefore a principal object of the present invention to provide an improved control circuit for a welding device.

A further object is to provide a control circuit that can more accurately control the weld time duration of a welding device.

A still further object of the present invention is to provide a control circuit for controlling a welding operation in which the weld time duration may be adjustably selected and preset by the individual operator.

Another object is to minimize the guesswork in welding and to reduce dependence upon the skill of the operator to produce good spot welds.

Another object of the present invention is to provide a control circuit for adjustably selecting a weld time duration of a welding device wherein the weld time duration can be easily and conveniently accurately selected by an operator.

A further object of the present invention is to minimize the effect of mechanically movable components of a control circuit for a welding device upon selection and control of weld time duration.

A still further object of the present invention is to provide a welding control circuit employing solid state components.

Another object of the present invention is to provide a welding control circuit of increased operational reliability.

A still further object of the present invention is to provide a control circuit for a welding device that permits spot welding operations to be accomplished easily and more quickly.

Another object of the present invention is to reduce distortion in materials being welded by providing a more accurate means to control the welding operation.

Another object is to provide means to produce more uniform welds.

These and other objects and advantages of the present invention will become apparent after considering the following detailed specification in conjunction with the accompanying drawings which show a preferred embodiment of the subject control circuit, and wherein.

Figure 1:
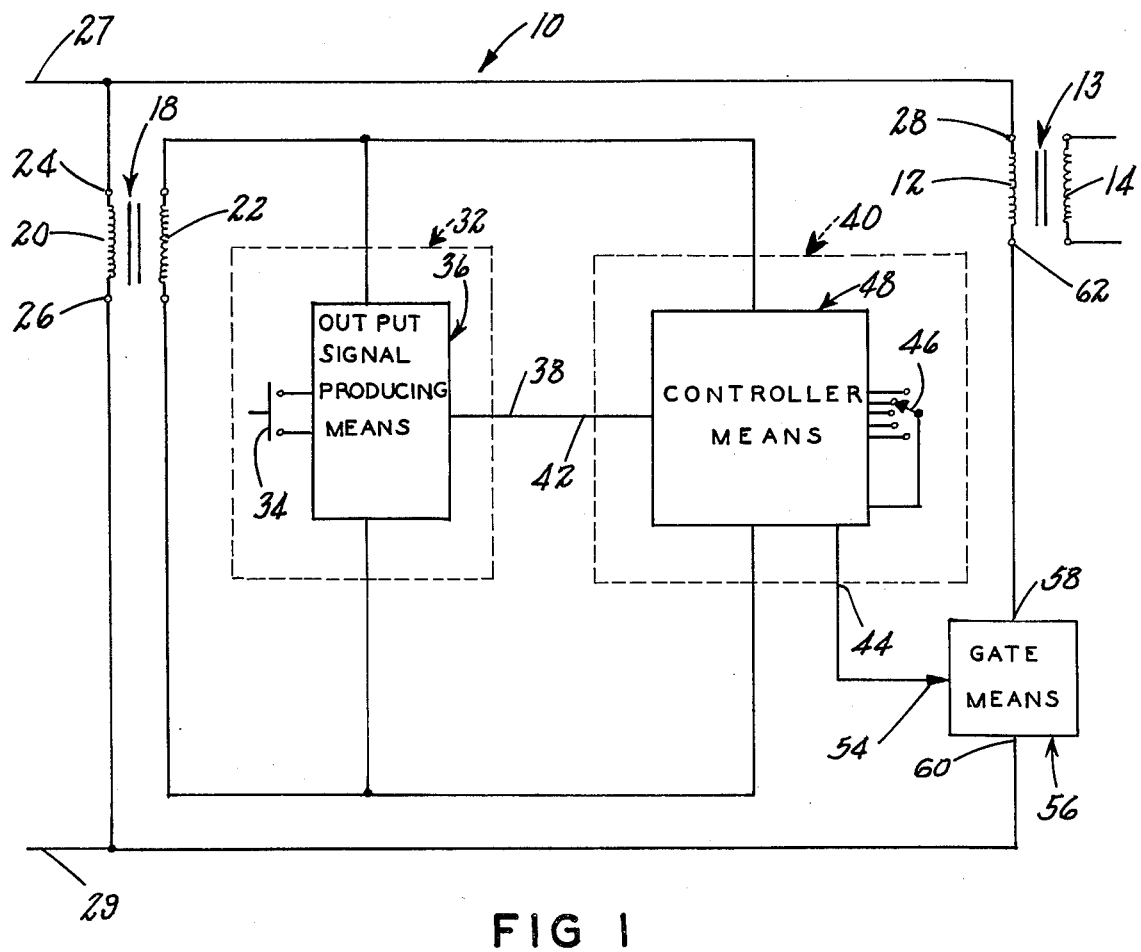
FIG. 1 is a block diagram of a control circuit for a welding device constructed according to the present invention.

Referring to the drawings more particularly by reference numbers, the number 10 in FIG. 1 refers generally to a control circuit for controlling the application of power to the primary winding 12 of a welding transformer 13 whose secondary winding 14 is connected across a pair of welding electrodes (not shown). The control circuit includes a control transformer 18 having primary and secondary windings 20 and 22, respectively, the first winding 20 of which has first and second terminals 24 and 26, respectively. The terminals 24 and 26 are connected to an AC power source (not shown) by connectors or leads 27 and 29, with terminal 24 also being connected to the first terminal 28 of the primary winding 12 of the welding transformer 13. A trigger circuit 32 is connected across the secondary winding 22 of control transformer 18 and includes operator actuatable means, such as switch 34, output signal producing means 36, and an output 38. A timing control circuit 40 is connected in parallel with trigger circuit 32 across the secondary winding 22 and has a weld control output 44 and an input 42 connected to output 38 of trigger circuit 32. The timing control circuit 40 includes operator adjustable means, such as multiposition switch 46, and controller means 48 which are responsive to output signals produced by trigger circuit 32. The circuit 48 generates weld output signals on output 44 and these last for the duration of a weld time interval under control of the setting position of the switch 46. The weld control output 44 of the circuit 48 is connected to control input 54 of gating means, such as the gating circuit 56, to control electrical communication between gate input terminal 58 and gate output terminal 60. The gate input 58 is connected to second terminal 62 of the primary winding 12 of welding transformer 13 and the gate output terminal 60 is connected to the terminal 26 of the primary winding 20 of the control transformer 18.

Prior to actuation of the pushbutton switch 34 the control circuit 10 will be in its normal or standby condition and no weld output signal will be present on the output 44 of the control timing circuit 40. Under these conditions no weld output signal is communicated to control input 54 of gating circuit 56 and there will be no electrical communication between the gate input and output terminals 58 and 60. Therefore, no current will flow through the primary winding 12 of the welding transformer 13 and generate a voltage potential thereacross. Consequently, no voltage potential will be generated across the secondary winding 14 of welding transformer 13 with the result that no welding will occur.

Thereafter, when switch 34 is depressed, a trigger output signal will be produced at the output 38 of the trigger circuit 32 by the output signal producing means 36. This signal is communicated to the input 42 of the timing control circuit 40 causing the controller means 48 to produce a weld output signal at the control input 54 of gating circuit portion 56 enabling electrical communication between the gate input and output terminals 58 and 60 thereby allowing current flow through the primary winding 12 of the welding transformer 13. This current flow will cause a voltage potential to be established across the secondary winding 14 resulting in current flow therethrough to the welding electrodes (not shown) thereby initiating a welding operation.

A weld output signal will remain on weld control output 44 of the timing control circuit 40 under control of the controller means 48 only so long as established by the setting of the switch 46. When the weld time interval selected by the switch 46 has elapsed the control circuit 10 will return to its normal standby state wherein no weld output signal is present on the output 44, and this condition prevents further electrical communication between the gate terminals 58 and 60 thereby terminating the welding operation.

Thereafter, if the user desires, he may initiate other succeeding welding operations of desired duration and my do so both quickly and easily by selectively setting the switch 46 to the desired weld duration, positioning the welding electrodes at appropriate locations to obtain the desired weld, and actuating the switch 34. Upon actuation of the switch 34 a welding operation of accurately controlled duration as determined by the positioning of switch 46 will thus be effected in the manner previously described and will result in production of a highly controllable quality weld. Such operation can be repeated time after time, if desired, at a certain given weld duration setting to obtain consistent quality welds time after time. Alternatively, the weld duration setting may be easily, yet accurately, varied from operation to operation to achieve quality welds even as welding parameters change. In either event, the present invention provides the user with a convenient and versatile, yet highly accurate, means for controlling welding operations resulting in more and better welds of high quality in a minimum of time.

Figure 2:
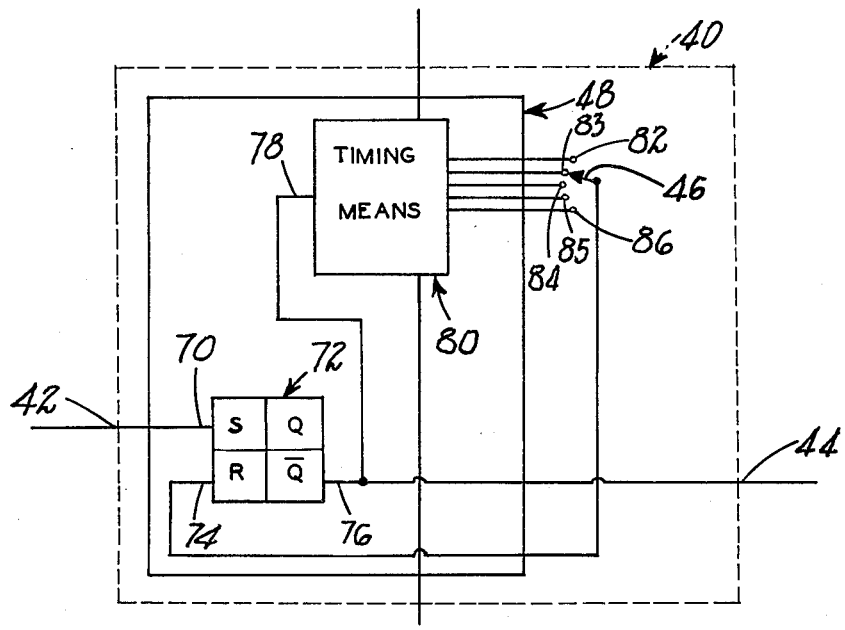
FIG. 2 is a block diagram in greater detail of a portion of the circuit of FIG. 1; and, FIG. 3 is a preferred embodiment of a control circuit constructed according to FIGS. 1 and 2 of the present invention.

FIG. 2 shows in block diagram form one type of controller means that may be employed for the block 48 of FIG. 1. The input 42 of the timing control circuit 40 is connected to a first input 70 of a control status means such as set-reset (S-R) flip-flop 72 whose other input 74 is connected to the movable contact of the switch 46. $\overline{Q}$ output 76 of the flip-flop 72 is connected to the weld control output 44 of circuit 40 and also to input 78 of timing means 80. When the control circuit 10 is in its normal standby condition, the flip-flop 72 is in its reset (R) condition and the $\overline{Q}$ output 76 is in a logic HI state. When a trigger output signal is detected on the set (S) input 70 of the flip-flop 72, the flip-flop changes to its logic LO state. This change also occurs on the output 44 causing a welding operation to be initiated, as previously explained. The same change is also detected at the input 78 of the timing means 80 causing the timing means 80 to begin timing out and to generate weld time interval output signals at appropriate switch contacts 82-86 after the passage of time intervals corresponding to respective switch contact settings. When a time interval output signal is generated at the selected contact of the switch 46 that signal is detected at the reset (R) input 74 of the flip-flop 72 causing the flip-flop to again change state by returning to its normal or reset condition. This causes the $\overline{Q}$ output 76 to change from the LO state to its standby HI state thereby causing the output 44 of timing control circuit 40 to return to a HI thus terminating the welding operation, as previously described. This change in state of $\overline{Q}$ output 76 upon resetting of the flip-flop 72 may also be used to cause the timing means 80 to reset and the HI signal at input 78 may be employed to thereafter hold the means 80 in its reset condition until the next time that the $\overline{Q}$ output 76 goes LO.

Although FIG. 2 shows a preferred form for block 48 of FIG. 1, it will be recognized by those skilled in the art that many other means may be equally as well employed to achieve the desired results and that the embodiment disclosed is descriptive of only one acceptable means that could be employed.

Figure 3:
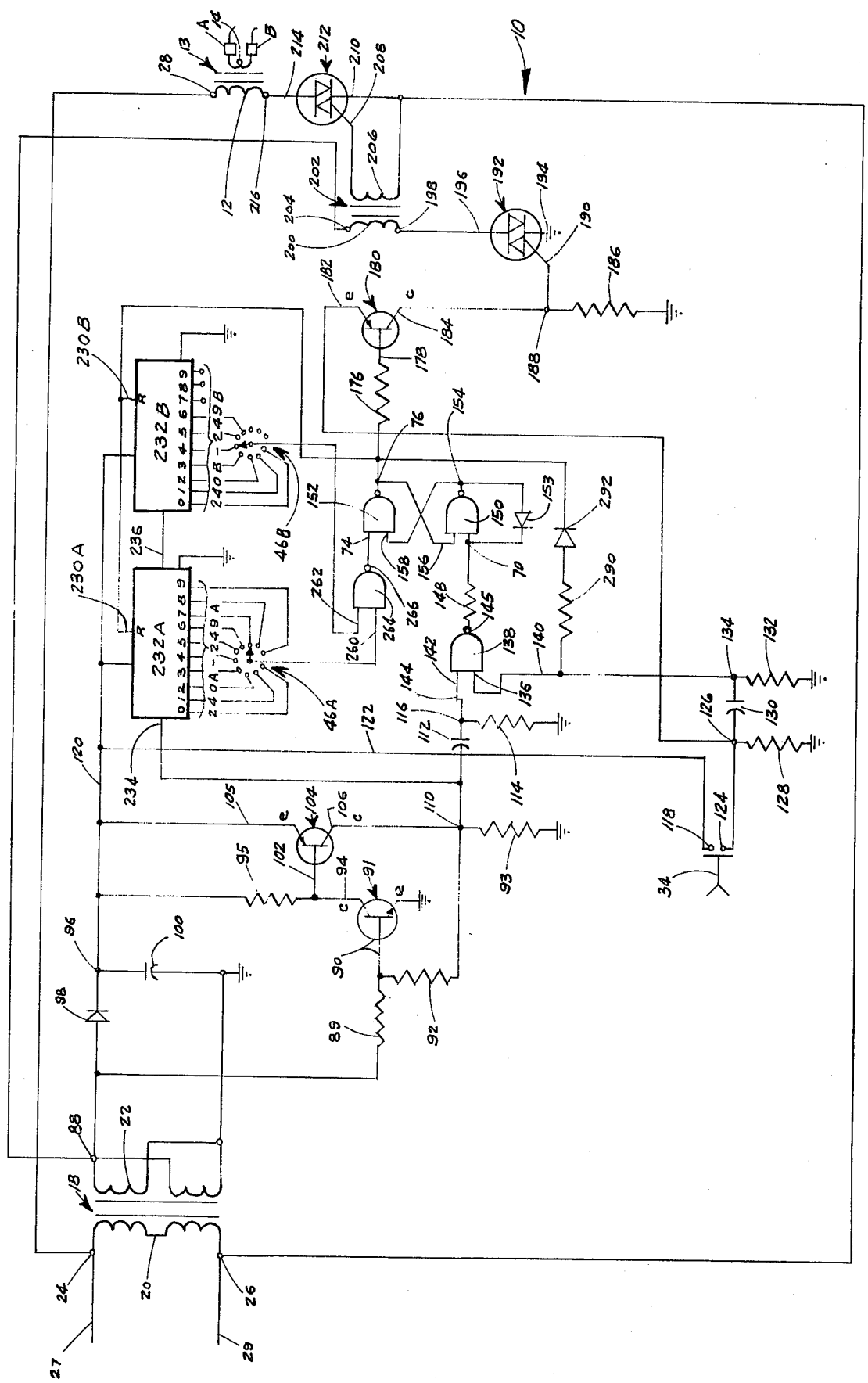

FIG. 3 shows in still more detail a preferred embodiment of the present invention constructed in accordance with FIGS. 1 and 2. This preferred embodiment includes, among other circuitry, a Schmitt trigger circuit connected across the secondary winding of the control transformer, which circuit generates a square wave signal that is utilized as a timing standard for various other portions of the control circuit in a manner which will be more fully explained hereinafter. As shown in FIG. 3, in the preferred embodiment the first terminal 88 of the secondary winding 22 of the control transformer 18 is connected through a resistor 89 to the base electrode 90 of an emitter grounded NPN transistor 91. Base electrode 90 is also connected to ground through series connected resistors 92 and 93 while collector 94 of the transistor 91 is connected through another resistor 95 to output 96 of a peak clamping circuit comprised of diode 98 and capacitor 100, which circuit is connected across the secondary winding 22 of the control transformer 18. The collector 94 of the transistor 91 is further connected to base 102 of the PNP transistor 104 which has its emitter 105 connected to the previously discussed peak clamping circuit output 96 and its collector 106 connected to ground through the resistor 93.

With the leads 27 and 29 connected to an AC power source a voltage potential of sinusoidal waveshape is generated across the primary winding 20 of the control transformer 18 and a voltage output of lesser potential and of corresponding waveshape is therefore present across the secondary winding 22. The peak clamping circuit including the diode 98 and the capacitor 100 acts to maintain a positive voltage potential at the peak clamping circuit output 96 regardless of the phase of the sinusoidal output present across the secondary winding 22, and therefore maintains a positive voltage potential on emitter 105 of transistor 104 and also on base 102 of transistor 104 and collector 94 of transistor 91 whenever transistor 91 is not conducting. The sinusoidal output across the winding 22 is also communicated to the base 90 of transistor 91 causing that transistor to begin conducting as the signal on the base 90 goes high. When this occurs the voltage potential on collector 94 of transistor 91 goes low pulling the base 102 of the transistor 104 low thereby causing the transistor 104 to begin conducting and resulting in application of the positive voltage potential present at the peak clamping circuit output 96 across the resistor 93. The application of this positive voltage potential establishes a positive voltage at circuit point 110 across the resistor 93 and this signal is fed back to the base 90 of the transistor 91 through the resistor 92 thereby causing the transistor 91 to latch ON.

The voltage potential across the resistor 93 at circuit point 110 will thereafter remain high until such time as the sinusoidal output across the secondary winding 22 of the control transformer 18 goes negative enough to override the positive voltage being fed to the base 90 of the transistor 91 through the resistor 92. When this occurs the base 90 of the transistor 91 will be pulled sufficiently low to cause transistor 91 to stop conducting and the collector 94 of transistor 91 will return high. At this time the base 102 of the transistor 104 will therefore also return high, causing the transistor 104 to stop conducting, and the voltage potential present at peak clamping circuit output 96 will thus be removed from across resistor 93.

The cyclic nature of operation of this Schmitt trigger circuitry results in the generation across the resistor 93 at circuit point 110 of a square wave signal of the same frequency of the AC power source, which square wave signal may thereafter be utilized for several other control operations in the present invention in ways which will be explained more fully by what follows. It will be recognized by those skilled in the art, however, that the foregoing description describes only one type of Schmitt trigger circuit that could be employed and that many other such circuits could be equally as well utilized in the present invention to achieve generation of a square wave signal such as is generated by the circuit described.

In the particular embodiment disclosed in FIG. 3, the square wave signal generated at circuit point 110 is thereafter employed in conjunction with pushbutton switch 34 and it associated circuitry to control generation of a trigger output signal when the switch 34 is depressed. In such application the square wave signal generated at the point 110 is differentiated by being fed through a high pass RC circuit, such as the circuit formed by capacitor 112 and resistor 114, to generate at circuit point 116 a pulse train output at a frequency equal to the frequency of the AC power source connected across the primary winding 20 of transformer 18. The peak clamping circuit output 96 is connected to a first switch terminal 118 associated with the pushbutton switch 34 by means of leads 120 and 122 to communicate the positive voltage potential present at clamping circuit output 96 to the pushbutton terminal 118. When the pushbutton 34 is depressed an electrical connection is established between the first switch terminal 118 and a second switch terminal 124 resulting in application of a positive voltage potential at circuit point 126 across grounded resistor 128. The voltage signal at the point 126 is differentiated by a high pass RC circuit formed by capacitor 130 and resistor 132 with the result that actuation of pushbutton switch 34 results in the generation of a positive going pulse at circuit point 134.

The positive going pulse at point 134 is fed to a first input 136 of NAND gate 138 through lead 140. A second NAND gate input 142 is connected by a lead 144 to the circuit point 116 of the differentiating circuit formed by the capacitor 112 and the resistor 114, at which point 116, as previously explained, is generated a pulse train at the frequency of the AC power source. When pulses are present simultaneously on both of the inputs 136 and 142 of NAND gate 138 the output 145 goes LO.

The output 145 of the NAND gate 138 is connected through resistor 148 to input 70 of a set-reset flip-flop formed by two cross-connected NAND gates 150 and 152. The input 70 is also connected through diode 153 to Q output 154 of the NAND gate 150. The resistor 148 is selected to have a high impedance with respect to the Q output 154 of NAND gate 150. In its normal standby state the set-reset flip-flop is normally in its reset condition with the result that the $\overline{Q}$ output 76 of the NAND gate 152 is normally HI and the Q output 154 of the NAND gate 150 is normally LO. Consequently, in standby condition, the inputs 70 and 156 of the NAND gate 150 are both HI and input 158 of the NAND gate 152 is LO. As will be explained more fully hereinafter, the input 74 of the gate 152 is HI while the set-reset flip-flop is in its standby condition.

When the pushbutton switch 34 is depressed a low going trigger output signal is generated at the output 145 of the NAND gate 138, as has been previously explained, and this pulls the input 70 of the NAND gate 150 down causing Q output 154 to go HI. When this occurs both the inputs 74 and 158 of the NAND gate 152 go HI and the $\overline{Q}$ output 76 goes LO driving input 156 of the NAND gate 150 LO. As this occurs, the voltage potential applied across the diode 153 and the resistor 148 causes input 70 of the NAND gate 150 to return HI. The Q output 154 of the NAND gate 150 is thereafter held HI by the presence of a LO on input 156 to the NAND gate 150.

The $\overline{Q}$ output 76 of the NAND gate 152 is connected through resistor 176 to base 178 of PNP transistor 180 whose emitter 182 is connected to the circuit point 126 and whose collector 184 is connected through resistor 186 to ground. When the pushbutton switch 34 is depressed a positive voltage is applied across the resistor 128 at the circuit point 126 and this positive voltage also is applied to the emitter 182 of the transistor 180. Consequently, when the $\overline{Q}$ output 76 of NAND gate 152 goes LO causing the base 178 of the transistor 180 to go low, the transistor 180 begins conducting thereby applying a positive voltage across the resistor 186 at circuit point 188. The circuit point 188 is connected to gate element 190 of a triac 192, a first anode 194 of which is connected to ground. The other anode 196 of the triac 192 is connected to terminal 198 of primary winding 200 of a worker transformer 202. The opposite terminal 204 of the primary winding 200 is connected to the terminal 88 of the secondary winding of the control transformer 18. The secondary winding 206 of worker transformer 202 is connected between gate element 208 and anode 210 of the high power triac 212. The anode 210 of the triac 212 is also connected to the second terminal 26 on the primary winding 20 of the control transformer 18, and the opposite anode 214 of the triac 212 is connected to the second terminal 216 of the primary winding 12 os the welding transformer 13.

When the switch 34 is depressed causing transistor 180 to begin conducting, a positive voltage potential is established across resistor 186 at point 188, which potential is also present at gate element 190 of triac 192 causing the triac to begin conducting and thereby completing a current flow circuit through the primary winding 200 of the worker transformer 202. Completion of this circuit results in generation of a voltage potential across the primary winding 200 of the transformer 202 and causes a voltage potential to also be produced across the secondary winding 206 with the result that the gate element 208 of the triac 212 becomes more positive than the anode 210. This causes the high power triac 212 to conduct and thereby completes a current flow circuit through the primary winding 12 of the transformer 13 which results in production of a voltage potential across the secondary winding 14 of welding transformer 13 and established a welding condition at the welding electrodes A and B.

The $\overline{Q}$ output 76 of the NAND gate 152 is also connected to reset inputs 230A and 230B of decade counters 232A and 232B, respectively. When the control circuit is in its normal or standby condition, the $\overline{Q}$ output 76 is HI holding decade counters 232A and 232B in their reset condition. When the Q output 76 goes LO, however, the reset signal is removed from counters 232A and 232B thereby enabling them to count. The decade counter 232A has a count input 234 connected to the circuit point 110 to receive the square wave signal generated thereat, as previously described. When the reset signal at the input 230A is removed the counter 232A will begin counting the cycles of the square wave input and as the counter 232A counts in this way it will produce outputs corresponding to the count then present in the counter at appropriate output terminals 240A–249A. After each tenth count by the counter 232A a carry-out count signal is generated on lead 236 as an input count to counter 232B. The counter 232B operates similarly to counter 232A and in so doing produces outputs on its output terminals 240B–249B as the count therein proceeds.

The counter outputs 240A–249A and 240B–249B of counters 232A and 232B, rexpectively, are connected to corresponding terminals of respective multiposition rotary switches 46A and 46B which can be set by the operator to any desired position depending upon the desired time duration of each spot welding operation. As illustrated in FIG. 3, and especially with relation to the rotary switch 46B, not all of the outputs of the decade counter need be wired depending on circumstances and needs. It can therefore be seen that the counters 232A and 232B begin counting input cycles of the AC power source at the time that a welding operation is initiated after depressing the pushbutton switch 34, and this counting continues until the counters have counted the number of cycles indicated by the setting of the switches 46A and 46B. If the switches 46B (coarse control) and 46A (fine control) are set to their "4" and "7" positions, respectively, the spot weld time will last for 47 cycles, which, for a sixty cycle AC source corresponds to a duration equal to 47/60 second, that is, approximately 0.78 second. It will be recognized that a greater or lesser number of counters and switches could also be employed for timing the duration of welding operations, and that the particular type and method of wiring together a plurality of counters and switches, as well as the frequency of the AC power source employed, will all influence the range of selectable weld time durations and the accuracy with which a particular weld time duration may be selected. It will be appreciated, however, that for a given power source and a particular timing circuit embodiment, accurate weld time durations can be easily and repetitively selected.

The movable contacts of the multiposition switches 46A and 46B are connected respectively to inputs 260 and 262 of NAND gate 264 whose output 266, which is normally HI, goes LO only when logic HI signals are present simultaneously on both of the inputs 260 and 262. In the situation depicted in FIG. 3 and described above, output 266 would go LO when weld time duration signals are simultaneously present on both the "4" terminal of switch 46B and the "7" terminal of the switch 46A, and the change at output 266 would be communicated to input 74 of the set-reset flip-flop formed by the NAND gates 150 and 152 causing the $\overline{Q}$ output 76 of NAND gate 152 to go HI and the Q output 154 of NAND gate 150 to go LO. When the flip-flop is thus reset the base 178 of the transistor 180 will go high causing the transistor 180 to stop conducting and the voltage potential across resistor 186 at circuit point 188 to return low. As soon as the circuit point 188 goes low it pulls the gate element 190 of the triac 192 low causing the traic to stop conducting. This in turn causes high power triac 212 to stop conducting thereby terminating the welding operation.

The $\overline{Q}$ output 76 of NAND gate 152 is also connected to circuit point 134 through resistor 290 and diode 292, and the purpose of these elements is to change the time constant of the high pass RC circuit which includes the capacitor 130 and the resistor 132 as soon as the $\overline{Q}$ output 76 goes LO. As previously explained, when pushbutton switch 34 is depressed a positive voltage potential is applied across resistor 128 at point 126 and differentiating by the RC circuit including capacitor 130 and resistor 132 to generate a pulse at point 134 which is communicated over lead 140 to NAND gate 138. Thereafter Q output 76 will go LO, and when it does so, point 134 will be positive with respect to output 76 and the RC circuit across resistor 128 will then include resistor 290 in the RC circuit ensures that the duration of the positive pulse communicated to input 136 of NAND gate 138 will be only sufficiently long enough to result in the generation of a single LO pulse at output 145 of NAND gate 138 for each actuation of pushbutton switch 34. Consequently, it may be seen that the embodiment of FIG. 3 includes means to ensure that only a single welding operation can be initiated for each actuation of the switch 34, regardless of how long the switch is held depressed.

It should also be noted that since the terminal 124 associated with the pushbutton switch 34 is connected to the circuit point 126 and to the emitter electrode 182 of the transistor 180, release of pushbutton switch 34 will remove the positive voltage potential established at point 126 by depression of the switch from the emitter 182 causing it to go low thereby terminating any welding operation then in progress and preventing further welding until such time as the pushbutton 34 is thereafter re-actuated. In other words, if the operator does not hold the pushbutton switch closed for a time duration at least equal to the time duration established by the setting of the switches 46A and 46B, the welding operation will automatically be terminated when the pushbutton switch 34 is prematurely released. A means such as this not only further assures that one and only one welding operation will take place for each operation of the pushbutton switch 34, which is an important advantage and feature of the subject device, but also acts as a means for terminating and inhibiting further welding under operator control. Such an inhibit means is useful not only in the event of a machine malfunction but also in instances wherein the particular embodiment of the control circuit employed permits selection of long duration weld times. In such an instance, the operator can terminate welding at any time prior to expiration of the selected weld time duration, if he determines such action necessary and desirable, and can do so both quickly and easily.

The subject control circuit thus provides means for accurately controlling the duration of welding operations and does so by means which afford a large measure of versatility and selectability of weld time durations. Because of its novel construction the circuit lends itself to use both for welding operations of repetitious time durations and also for welding operations requiring varying time durations, and it functions accurately and reliably over long periods of time with little or no requirement for maintenance or mechanical adjustments.

There has thus been shown and described a preferred embodiment of novel control circuit for a welding device which fulfills all of the objects and advantages sought therefor. It is apparent, however, as indicated, that many changes, modifications, variations, and other uses and applications of the subject control circuit are possible and will become apparent to those skilled in the art after considering this specification, which describes a preferred embodiment only. All such changes, modifications, variations and other uses and applications which do not depart from the spirit and scope of the invention are deemed to be covered by the invention which is limited only by the claims which follow.

What is claimed is:

1. A control circuit for a welding device for establishing a weld time duration and controlling the time duration completion of a power circuit to the welding device comprising first and second connection means for connecting said control circuit to a power source, a welding transformer having primary and secondary windings thereof, said primary winding having first and second terminals thereon, a control transformer having primary and secondary windings thereof, said primary winding having first and second terminals thereon, said first terminal of the primary winding of the control transformer being connected to said first terminal of the primary winding of the welding transformer and to said first connection means, said second terminal of the primary winding of the control transformer being connected to second connection means, a trigger circuit portion connected across said secondary winding of the control transformer, said trigger circuit portion including operator actuatable means and means for producing a trigger output signal in response to actuation of said operator actuatable means, said means for producing a trigger output signal including a pulse generator for generating periodic signals and gate means, said gate means being responsive to the generation of a periodic signal at a time when said operator actuatable means are actuated to produce a trigger output signal, control status means capable of being in one of two control states and including a bistable device with first and second input means, said first input means operatively connected to said trigger circuit portion to receive said trigger circuit output signal, said bistable device being responsive to receipt of said trigger output signal of said trigger circuit portion to establish a first control state in said control status means, a timing circuit portion connected in parallel with said trigger circuit portion across said secondary winding of the control transformer, said timing circuit portion including timing means and operator adjustable means for selecting and establishing a weld time interval, said timing means including means for detecting the control state of said control status means and time passage means responsive to detection of the first control state of said control status means for generating a time interval output after the passage of an amount of time equal to the selected weld time interval established by the selective adjustment of said operator adjustable means, said second input means of said control status means connected to said timing circuit portion to receive said time interval output, said bistable device being responsive to receipt of said time interval output of said timing circuit portion to establish a second control state in said control status means, a gating circuit having gate input means connected to said second terminal of the primary winding of the welding transformer and gate output means connected to said second connection means, said gating circuit including control input means connected to said control status means to detect the control state thereof and other means responsive to detection of said first control state of said control status means for completing a circuit between said gate input means and said gate output means, said circuit completion enabling current to flow through said primary winding of said welding transformer so long as said control status means is in said first control state, means responsive to establishment of said first control state in said control status means for preventing the production of more than one trigger output signal for each activation of said operator actuatable means, and a high-pass RC filter circuit having an input connected to said operator actuatable means and an output connected to said gate means, said responsive means for preventing the production of more than one trigger output signal for each activation of said operator actuatable means including means to alter the time constant of said filter circuit.

2. The control circuit defined in claim 1 including inhibit means responsive to de-actuation of said operator actuatable means to generate an inhibit output, said inhibit output being operatively connected to said gating circuit to inhibit further communication between said gate input means and said gate output means of said gating circuit.

3. The control circuit defined in claim 1 wherein said bistable device has first and second outputs and said control input means of said gating circuit is operatively connected to one of said bistable device outputs.

4. The control circuit defined in claim 3 wherein said timing means includes a status input, said status input being operatively connected to one of said bistable device outputs.

5. The control circuit defined in claim 1 wherein said timing means has a count input connected to said pulse generator and said time passage means includes means for counting said periodic signals generated by said pulse generator while said control status means is in said first control state.

6. The control circuit defined in claim 1 wherein said gating circuit includes a worker transformer having primary and secondary windings and primary and secondary circuit portions associated with said primary and secondary windings, said primary circuit portion being responsive to detection of said first control state for completing a circuit through said worker transformer primary winding to generate power across the secondary winding thereof, said secondary portion including means responsive to generation of power across said worker transformer secondary winding to complete a circuit between said gate input and gate output means.

7. The control circuit defined in claim 6 including means connecting said operator actuatable means to said primary circuit portion of said gating circuit, said primary circuit portion including means responsive to de-actuation of said operator actuatable means to prevent further circuit completion through the worker transformer primary winding regardless of the control state of said control status means.

8. A circuit for establishing a weld time duration for a welding operation and controlling application of power through a power circuit to a welding transformer and to a welding electrode during such weld time duration, comprising a control circuit and means for supplying power to the control circuit and to the welding transformer, said control circuit including operator actuatable means for effecting initiation of a welding operation and means under control of actuation of said operator actuatable means for producing a control signal to effect a welding operation, a timing control circuit portion operatively connected to receive the control signals produced by actuations of said operator actuatable means, said timing control circuit portion including means settable to establish a desired weld time duration for the welding operation, said timing control circuit portion including means responsive to receipt of said control signal by said timing control circuit and to the setting of the settable means for generating a timed weld output signal having a duration corresponding to the desired weld time duration established by the setting of the settable means, means under control of said timed weld output signal from said timing control circuit portion for establishing a power connection between the power supply means and the welding transformer for the duration of the established weld time, and means responsive to generation of said output signal for preventing the production of more than one timed weld output signal for each activation of said operator actuatable means, said means for producing a control signal including a filter circuit having an input connected to said operator actuatable means and an output connected to said control circuit portion, said means for preventing the production of more than one timed weld output signal for each activation of said operator actuator means including means to alter the time constant of said filter circuit.

9. The circuit defined in claim 8 wherein the power suppy means includes an AC power supply and means for operatively connecting said AC power supply to said control circuit and the welding transformer, the settable means including a multi-position switch the setting of which controls the termination of said timed weld output signal after initiation thereof and at a time corresponding to the established weld time duration, the corresponding time being a time required for the occurrence of a predetermined number of cycles of the power supply as determined by the setting of the settable means.

10. The circuit defined in claim 8 wherein the power supply means includes a control transformer having primary and secondary windings, the primary winding of which is connected in parallel with a series circuit that includes the primary winding of the welding transformer and the means under control of the timed weld output signal of the timing control circuit, the welding electrode being connected in circuit with the secondary winding of the welding transformer, the secondary winding of the control transformer being operatively connected to said control circuit to provide power therefor.

11. The circuit defined in claim 8 wherein the settable means includes a pair of decade switches and means for connecting said switches into the timing control circuit portion so that the setting of one of said switches establishes the units position of the number of cycles of the power supply that are to be counted during a welding operation and the setting of the other of said switches establishes the tens position thereof.

* * * * *

UNITED STATES PATENT OFFICE
CERTIFICATE OF CORRECTION

Patent No. 4,230,929          Dated October 28, 1980

Inventor(s) Bruce A. Blair and Howard G. McClure

It is certified that error appears in the above-identified patent and that said Letters Patent are hereby corrected as shown below:

Column 6, line 18 "it" should be --its--

Column 9, line 5 "entiating" should be --entiated--

Column 9, line 8 "Q" should be --$\bar{Q}$--

Column 9, line 9 "to output" should be --to $\bar{Q}$ output--

Column 12, line 31 "suppy" should be --supply--

Signed and Sealed this

Third Day of March 1981

[SEAL]

Attest:

RENE D. TEGTMEYER

*Attesting Officer*   *Acting Commissioner of Patents and Trademarks*